US006940320B2

(12) United States Patent
Sukup et al.

(10) Patent No.: US 6,940,320 B2
(45) Date of Patent: Sep. 6, 2005

(54) POWER CONTROL SYSTEM STARTUP METHOD AND CIRCUIT

(75) Inventors: Frantisek Sukup, Zasova (CZ); Josef Halamik, Roznov P. R. (CZ); Jefferson W. Hall, Chandler, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 10/685,094

(22) Filed: Oct. 14, 2003

(65) Prior Publication Data

US 2005/0077933 A1    Apr. 14, 2005

(51) Int. Cl.[7] .............................................. H03K 1/00
(52) U.S. Cl. ...................................... 327/112; 327/143
(58) Field of Search ........................ 327/108, 110, 142, 327/143

(56) References Cited

U.S. PATENT DOCUMENTS

| | | | | |
|---|---|---|---|---|
| 5,014,178 A | * | 5/1991 | Balakrishnan | ............... 363/49 |
| 5,285,369 A | * | 2/1994 | Balakrishnan | ............... 363/49 |
| 5,477,175 A | | 12/1995 | Tisinger et al. | |
| 5,892,389 A | * | 4/1999 | Lai | ........................... 327/543 |
| 5,973,942 A | | 10/1999 | Nelson et al. | ............... 363/21 |
| 6,429,701 B2 | * | 8/2002 | Karaki et al. | ............... 327/110 |
| 6,775,164 B2 | * | 8/2004 | Wong et al. | ............... 363/147 |

* cited by examiner

*Primary Examiner*—Jeffrey Zweizig
(74) *Attorney, Agent, or Firm*—Robert F. Hightower

(57) ABSTRACT

A power control system uses two separate currents to control a startup operation of the power control system. One of the currents has a small value and is used to charge an output voltage to an initial value. Once the initial value is reached, a second current that has a large value is used to charge the output voltage to an operating voltage value.

19 Claims, 3 Drawing Sheets

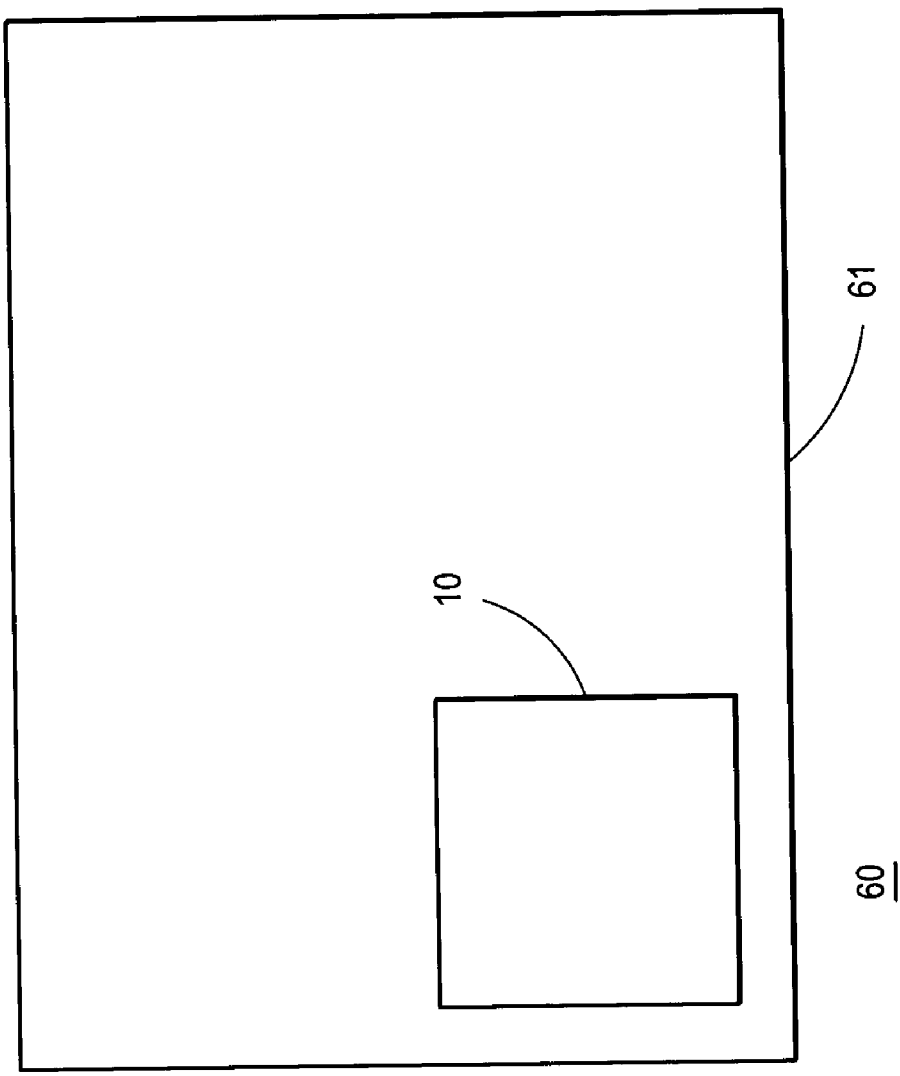

POWER CONTROL SYSTEM STARTUP METHOD AND CIRCUIT

BACKGROUND OF THE INVENTION

The present invention relates, in general, to electronics, and more particularly, to methods of forming semiconductor devices and structure.

In the past, the electronics industry utilized various methods and devices to control high value or large input voltages in order to provide controlled output voltages and currents. One example of such a device, referred to as an off-line bootstrap startup circuit, was disclosed in U.S. Pat. No. 5,477,175 which was issued to Tisinger et al on Dec. 19, 1995 and which is hereby incorporated herein by reference. The bootstrap startup circuit received a large input voltage and produced an output current that charged a capacitor and generated an output voltage. However, many applications required a sequence of currents that could be controlled to charge the capacitor and form the output voltage. However, using multiple bootstrap startup circuits increased the manufacturing cost and complexity of the resulting semiconductor products and of applications using the products.

Accordingly, it is desirable to have a startup circuit that can receive an input voltage having a high voltage value and produce a sequence of currents from the input voltage, and that reduces manufacturing costs.

BRIEF DESCRIPTION OF THE DRAWINGS

FIG. 3 illustrates an enlarged plan view of a semiconductor device that includes the high voltage startup circuit of FIG. 1 in accordance with the present invention.

For simplicity and clarity of illustration, elements in the figures are not necessarily to scale, and the same reference numbers in different figures denote the same elements. Additionally, descriptions and details of well known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor.

DETAILED DESCRIPTION OF THE DRAWINGS

Figure 1:
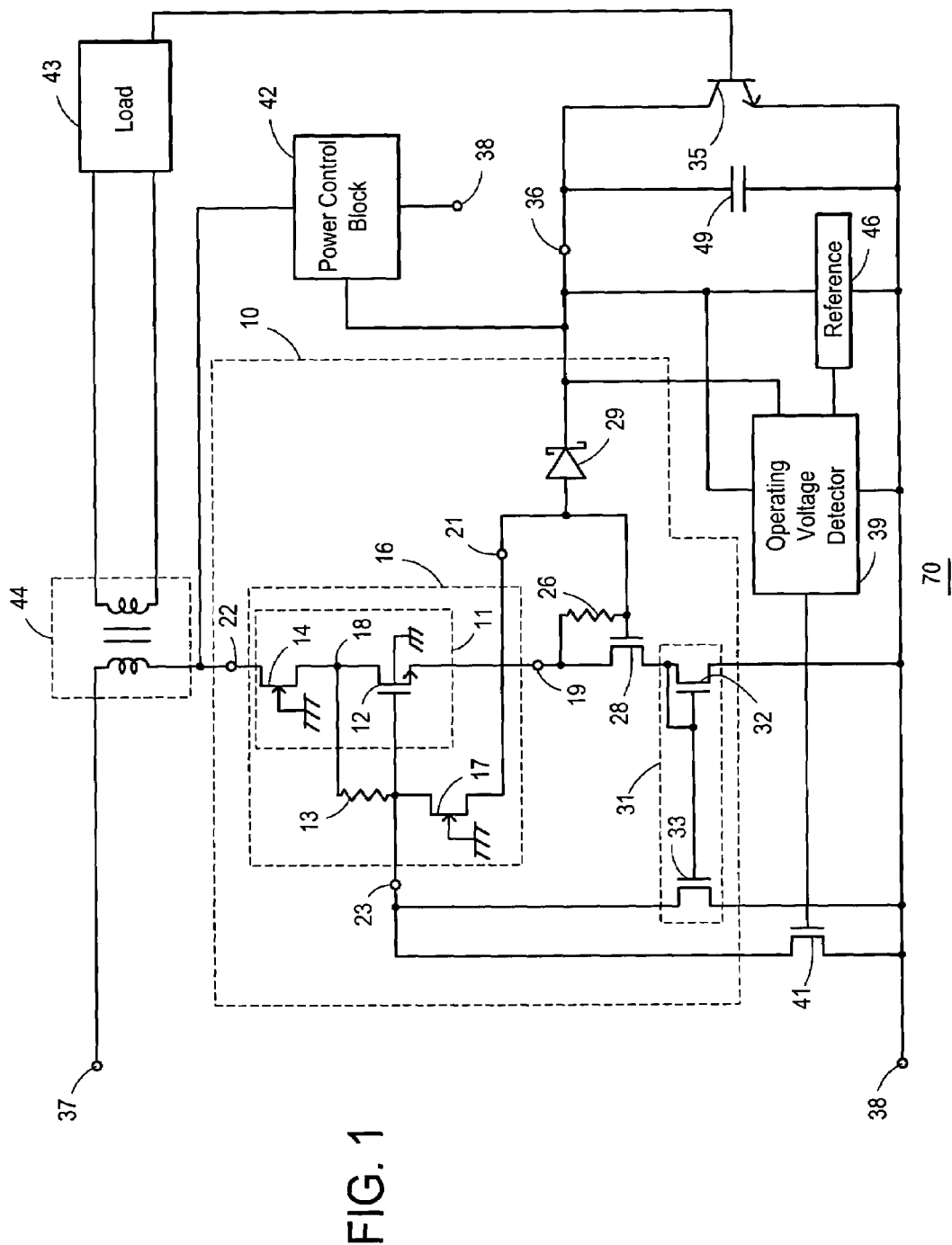
FIG. 1 schematically illustrates an embodiment of a portion of a power control system that includes a high voltage startup circuit in accordance with the present invention.

FIG. 1 schematically illustrates an embodiment of a portion of a high voltage startup circuit 10 that has a dual operating mode and that can generate multiple output currents from a single high voltage input. Circuit 10 generally is a part of a power control system 70 and is used to control the startup sequence of system 70. Circuit 10 includes a high voltage current control device 16 that includes a high voltage current control element 11 that is formed to include a high voltage J-FET transistor 14 and a MOS transistor 12. Circuit 10, device 16, and element 11 are identified in a general way by dashed boxes. Device 16 also includes a pinched resistor 17, and a bias resistor 13 that is formed to provide a bias current to the gate of transistor 12. Device 16 is formed to receive a high voltage on a high voltage input 22 and generate an output current on an output 19 in response to control signals applied to a control input 23. Device 16 also generates another output current, as the bias current, through resistor 17 as will be seen further hereinafter.

In order to provide this functionality, a drain of transistor 14 is connected to input 22 and a source is connected to a common node 18. A drain of transistor 12 is connected to the source of transistor 14 and to node 18. A gate of transistor 12 is connected to input 23 and to a first terminal of resistor 13, and a source is connected to output 19. A second terminal of resistor 13 is connected to the source of transistor 14 and to the drain of transistor 12. Transistor 14 is formed as a J-FET transistor with the substrate used as the gate of the transistor, thus, the gate connection of transistor 14 is shown connected to the body. Typically, the substrate and body are connected to the most negative potential in the system. Resistor 17 is formed as a low pinch-off voltage J-FET with the gate connected to the substrate. A first terminal of resistor 17 is connected to the gate of transistor 12 and a second terminal is connected to an output 21 of device 16. The first terminal of resistor 17 is the equivalent drain of the J-FET and the second terminal is the equivalent source. Output 21 is connected through a diode 29 to an output 36 of circuit 10. In the preferred embodiment, transistor 12 is an N-channel MOS transistor, transistor 14 is an N-channel J-FET transistor, and pinch resistor 17 is formed as an N-channel J-FET with the gate formed by the substrate and an overlying P-type region both connected to the substrate. In other embodiments, transistor 12 may be other transistors structures such as a J-FET or a bipolar transistor.

The breakdown voltages for resistor 17 and transistors 12 and 14 depend on the application and various other factors. In one embodiment for world wide line voltage applications, the breakdown voltage at the drain of transistor 14 with respect to the substrate may exceed four hundred volts (400 V) and the sustainable voltage at the source of transistor 12 may exceed fifty volts (50 V).

When the voltage applied at input 22 is less than the pinch-off voltage of transistor 14, output 19 follows the voltage applied to node 18. When the voltage applied at input 22 is greater than the pinch-off voltage of transistor 14, transistor 14 turns-on in the drain current saturation mode and the output of device 16 is controlled by the voltage applied to control input 23. If no external voltage is applied to input 23, for example input 23 is floating, resistor 13 supplies a gate bias current from transistor 14 to enable both device 16 and transistor 12 to generate an output current at output 19. In an operational circuit, an external control voltage typically is applied to input 23 to control the value of the output current. When the voltage applied to input 23 produces a gate-to-source voltage that is less than the threshold voltage of transistor 12, transistor 12 typically is disabled.

Startup circuit 10 uses device 16 for controlling a high voltage startup sequence of circuit 10 and a startup sequence of power control system 70. Circuit 10 receives an input voltage between a voltage input 37 and a voltage return 38. Other components of the power control system such as a filter capacitor 49, an operating voltage detector 39, a reference 46, a disable transistor 41, a transformer 44, a power control block 42, an inhibit transistor 35, and a load 43 typically are externally connected to circuit 10 in order to provide the desired power control functions. Capacitor 49, detector 39, transistor 41, reference 46, transformer 44, power control block 42, and load 43 are shown to assist in describing the operation of device 16 and circuit 10. Those skilled in the art understand that other well known components and functions that are not shown in FIG. 1 typically are included to form a complete power control system. In most embodiments, capacitor 49, transformer 44, power control block 42, and load 43 are external to the semiconductor die on which device 16 and circuit 10 are formed. In some embodiments, portions or all of block 42 may be another portion of the semiconductor die on which device 16 and circuit 10 are formed.

Reference 46 provides a reference voltage on an output of reference 46. The reference voltage is used by detector 39 to set the detection level for detecting the operating voltage value. Detector 39 is formed to receive the reference voltage and the output voltage on output 36 and responsively disable device 16 when the output voltage is equal to or greater than the desired operating voltage value. In the preferred embodiment, detector 39 has hysteresis to prevent detector 39 from switching on and off as the output voltage varies slightly around the desired operating voltage value.

Device 16 and circuit 10 are utilized to provide an initial current that is small and is used to charge capacitor 49 when power is applied to the power control system. After the voltage at output 36 has reached an initial voltage, device 16 supplies a large output current to charge capacitor 49 to an operating voltage. Circuit 10 controls the value of the large output current to produce a controlled current. The value of the initial voltage typically is much less than the value of the operating voltage. The initial voltage value usually is selected to be as low as possible so that capacitor 49 may be charged to the initial value as soon as possible in order to minimize the amount of time required to startup system 70. The operating voltage value typically is selected to be a value that provides normal operation for other circuits external to circuit 10 such as load 43.

Prior to applying power to input 37, capacitor 49 is discharged and output 36 is at zero volts. Consequently, circuit 10 is not operating and there is no output current from device 16. When an input voltage is applied to input 37, current begins to flow through transformer 44 and into input 22 of device 16. As the voltage on input 22 increases, transistor 14 turns-on and supplies a bias current through resistor 13 to the gate of transistor 12. Since resistor 17 is connected through diode 29 to output 36 and is proprely designed with respect to the size of resistor 13 and capacitor 49 is discharged, resistor 17 pulls input 23 low and disables transistor 12. The bias current from resistor 13 flows through resistor 17 to output 36 as the initial current and begins charging capacitor 49, thus, resistor 17 keeps transistor 12 disabled and no current flows from output 19 of device 16. The output voltage on output 36 is less than the operating voltage so the output of detector 39 is low and transistor 41 is disabled. Since resistor 17 is a pinch resistor and the gate is connected to the lowest potential, the current flow through resistor 17 depends on the potential at the source or the terminal connected to output 36. As the bias current from resistor 13 flows through resistor 17 as the initial current and charges capacitor 49, the voltage at output 36 increases and causes a corresponding decrease in the current flowing through resistor 17. When the voltage at output 36 reaches the pinch-off voltage of resistor 17, the current path through resistor 17 is cut-off and resistor 17 ceases conducting. The bias current from resistor 13 now enables transistor 12 which generates an output current at output 19. Consequently, transistor 12 can be viewed as the output transistor of circuit 10. Transistor 12 is formed to provide a current that is larger than the initial current that can be supplied by resistor 17 in order to quickly charge capacitor 49 to the operating voltage value. Typically transistor 12 is formed to supply between about thirty (30) to two thousand (2000) times the current of resistor 17. It can be seen that the pinch-off voltage of resistor 17 minus the threshold voltage of transistor 12 sets the value of the initial voltage. In one embodiment the pinch-off voltage was designed to be about three volts (3.0 V) and the corresponding initial voltage value was about 1.2 volts.

Once transistor 12 is enabled, circuit 10 controls the output current from transistor 12 to supply a controlled current to output 36. The controlled output current begins charging capacitor 49. In order to control the output current of device 16, circuit 10 has a current control loop that includes a sense resistor 26, a sense transistor 28, and a current mirror 31 that includes a reference transistor 32 and a mirror transistor 33. The output current generated at output 19 is controlled by the current control loop. The current at output 19 flows through resistor 26 and generates a corresponding voltage drop across resistor 26. Resistor 26 is connected between the gate and source of transistor 28 and forms the gate-to-source voltage of transistor 28, thus, the voltage drop across resistor 26 establishes a sense current flow through transistor 28. Current mirror 31 receives the sense current from transistor 28 and responsively controls the voltage applied to control input 23 thereby controlling the gate voltage of transistor 12 and the value of the output current of element 11 and device 16. As the output current on output 19 increases, the sense current correspondingly increases and responsively lowers the gate voltage of transistor 28 and correspondingly the control voltage on input 23 to reduce the output current value. Those skilled in the art understand that transistors 28, 32, and 33 may also be bipolar transistors. The two current control loops may be omitted in some embodiments.

When the controlled output current has charged capacitor 49 to the operating voltage value, the output of detector 39 switches to a high value thereby enabling transistor 41 and disabling transistor 12 and device 16. Transistor 41 sinks the bias current from resistor 13. The value of resistor 13 is designed to minimize the power dissipation when transistor 41 sinks the bias current and to ensure that resistor 17 can supply sufficient current to charge capacitor 49 in a desired time period. Diode 29 prevents current from flowing back from output 36 to return 38 while transistor 41 is enabled. In the preferred embodiment, detector 39 has hysteresis to prevent detector 39 from switching on and off as the output voltage varies slightly around the operating voltage value. Due to the hysteresis input, detector 39 re-enables transistor 12 and device 16 when the output voltage decreases to a value that is approximately equal to the operating voltage value minus the hysteresis offset voltage of detector 39.

During the operation of circuit 10, it may be appropriate to inhibit circuit 10. For example, load 43 may detect a condition that requires disabling circuit 10. In such a case, load 43 or another circuit (not shown) may enable transistor 35 to pull output 36 low and inhibit operation of circuit 10. Pulling output 36 low discharges capacitor 49. When capacitor 49 is discharged to a value less than the hysteresis offset of detector 39, the output of detector 39 goes high and disables transistor 41 thereby permitting resistor 13 to supply current to transistor 12 and enabling transistor 12 to produce the output current. Transistor 35 sinks the controlled output current and continues to discharge capacitor 49. When capacitor 49 is discharged to a value less than the initial voltage value, resistor 17 conducts the bias current from resistor 13 as the initial current to transistor 35. Transistor 35 sinks the initial current and disables transistor 12 to inhibit circuit 10. In order to ensure that the inhibit function operates properly, the initial voltage should be greater than the saturation voltage of transistor 35. Transistor 12 no longer supplies the output current, thus, transistor 35 only has to sink the bias current and not the output current. Inhibiting circuit 10 usually also inhibits operation of the power supply controller within power control block 42. Usually there is a connection between output 36 and the power supply controller to facilitate such operation. Since the bias current is small compared to the output current, generally about thirty (30) to two thousand (2000) and preferably about fifty (50) times less, the power dissipation is minimized, the startup circuit is inhibited, and device 16 supplies a standby current approximately equal to the bias current. Thus, this method provides an easy method to inhibit the operation of circuit 10 while maintaining a standby current and provides a method that allows easily recharging capacitor 49 when load 43 disables transistor 35. It is important to minimize the amount of power dissipated while system 70 is inhibited. Because of the low current of the bias current, thus of the initial current, this method of inhibiting system 70 minimizes the amount of power dissipated from the voltage applied to input 37. Typically the value of the bias current is chosen to be less than the standby current specified in certification criteria such as the criteria known under the trademark ENERGY STAR®. It can be seen that device 16 and transistor 35 form an inhibit circuit of system 70. Additionally, detector 39 could also use other control sequences such as enabling device 16 to supply only the output current after detecting the initial voltage value, or could reverse the sequence and supply the output current before detecting the initial voltage value and supply the bias current after detecting the initial voltage value, etc.

Those skilled in the art will understand that transistor 35 may be enabled at any time in the operational sequence and the inhibit function begins at the output voltage and current values existing at that time.

Figure 2:
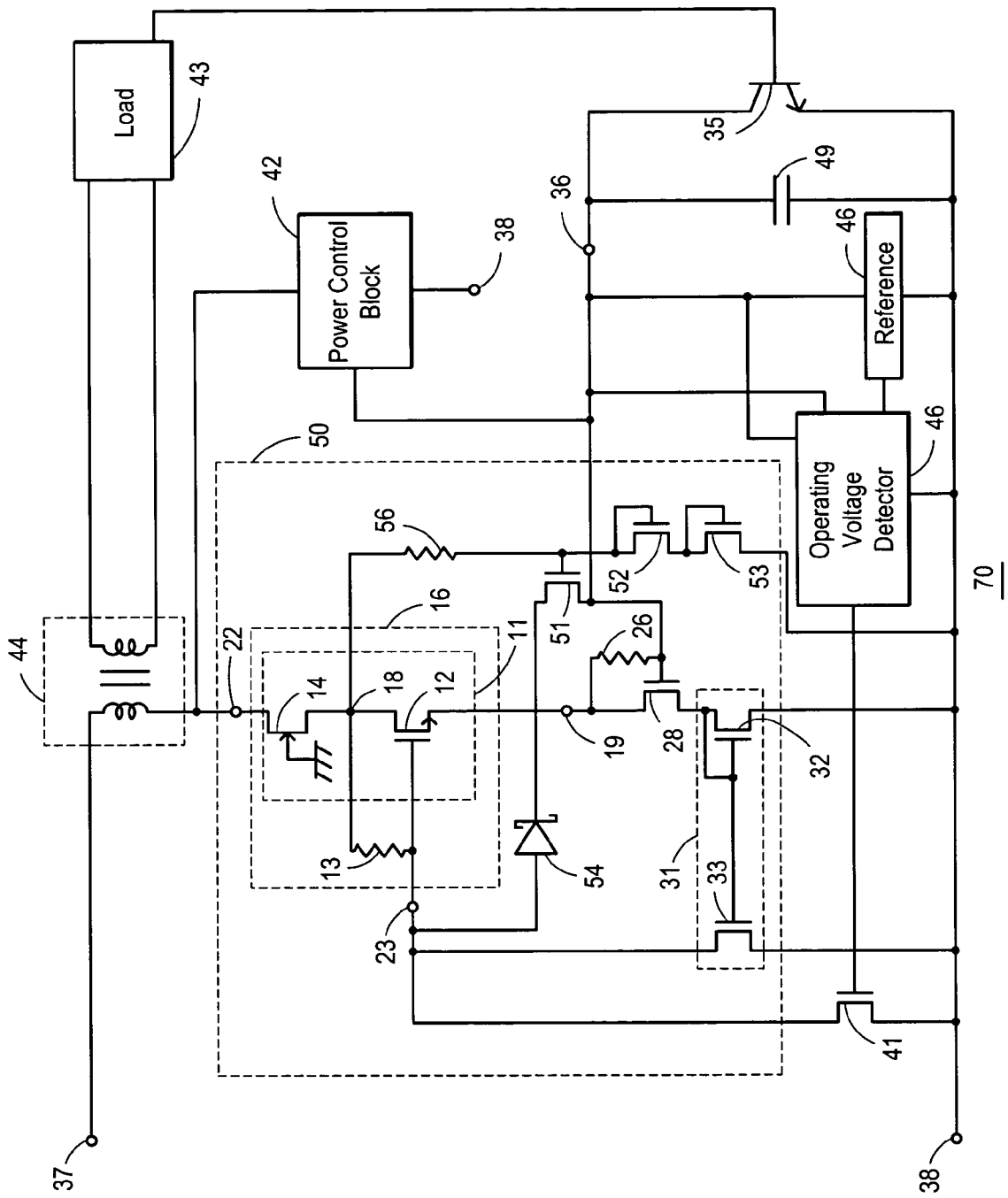
FIG. 2 schematically illustrates another embodiment of the power control system and the high voltage startup circuit of FIG. 1 in accordance with the present invention.

FIG. 2 schematically illustrates an embodiment of a portion of a high voltage startup circuit 50 that is an alternate embodiment of circuit 10 described in the description of FIG. 1. Circuit 50 is identified in a general manner by a dashed box. Circuit 50 includes a comparator coupled transistor 51 that is used to supply the initial current, to disable transistor 12 when the output voltage is less than the initial voltage, and to enable device 16 after the output voltage reaches the initial voltage value. A drain of transistor 51 is connected to input 23 of device 16 through a diode 54. A source of transistor 51 is connected to output 36 to receive the output voltage, and a gate is connected to both a drain and a gate of a transistor 52 to receive a reference voltage from transistors 52 and 53. A first terminal of a gate bias resistor 56 is connected the gate of transistor 51 and a second terminal is connected to node 18. A source of transistor 52 is connected to both a gate and a drain of transistor 53. A source of transistor 53 is connected to return 38.

Transistors 52 and 53 are stacked in series and formed to have the threshold voltages adjusted to provide a fixed reference voltage at the drain of transistor 52. Resistor 56 provides a bias current to bias transistors 52 and 53 at the desired reference voltage. In the preferred embodiment, the threshold of each of transistors 52 and 53 is adjusted to approximately 2.3 volts each and the resulting reference voltage is approximately 4.6 volts. Similarly to the operation of circuit 10, when power is applied to input 37, capacitor 49 is discharged and output 36 is at zero volts. When transistor 14 turns-on and resistor 13 supplies a bias current to transistor 12, the source of transistor 51 is low and the gate is charged to the reference voltage, thus, transistor 51 is enabled. Transistor 51 pulls the gate of transistor 12 to the low voltage of discharged capacitor 49 thereby disabling transistor 12. Transistor 51 also conducts the bias current as the initial current to output 36 which ensures that transistor 12 remains disabled and also begins charging capacitor 49. The output voltage on output 36 is less than the operating voltage so the output of detector 39 is low and transistor 41 is disabled. As the initial current from transistor 51 charges capacitor 49, the source voltage of transistor 51 increases and causes a corresponding decrease in the gate-to-source voltage thereby reducing the current flowing through transistor 51. When the voltage at output 36 reaches a value approximately equal to the reference voltage applied to the gate of transistor 51 minus the threshold voltage of transistor 51, the current path through transistor 51 is cut-off and transistor 51 ceases conducting. The bias current from resistor 13 enables transistor 12 which generates the second output current at output 19. A diode 54 prevents current from flowing back into input 23 through the intrinsic body diode of transistor 51 when the drain of transistor 51 is at a lower voltage than the source, such as when transistor 41 disables transistor 12. It can be seen that the reference voltage minus the threshold voltage of transistor 51 sets the value of the initial voltage. Once transistor 12 is enabled, circuit 10 controls the output current from transistor 12 to supply a controlled current to output 36.

Enabling transistor 35 to pull output 36 low discharges capacitor 49. When capacitor 49 is discharged to a value less than the hysteresis offset of detector 39, the output of detector 39 enables transistor 12 to produce the output current. Transistor 35 sinks the output current and continues to discharge capacitor 49. When capacitor 49 is discharged to a value less than the initial voltage value, transistor 51 conducts the bias current from resistor 13 as the initial current to transistor 35. Transistor 35 sinks the initial current which disables transistor 12.

FIG. 3 illustrates an enlarged plan view of a semiconductor device 60 that includes device 16 and circuit 10 of FIG. 1. Device 60 is formed on a semiconductor die 61.

In view of all of the above, it is evident that a novel device, method of forming the device, and method of using the device is disclosed. Included, among other features, is inhibiting the operation of a power control system by pulling the output of a startup device to a low voltage. The low voltage on the output causes the startup device to disable charging current and inhibits operation of the power control system.

What is claimed is:

1. A power control system startup method comprising:
    coupling a high voltage device to receive an input voltage and responsively generate a bias current and couple the bias current to an output transistor of the high voltage device;
    coupling a switch element to shunt the bias current away from the output transistor when an output voltage is less than a first value; and
    coupling the bias current to a control electrode of the output transistor of the high voltage device to generate an output current that is greater than the bias current when the output voltage is greater than the first value.

2. A power control system startup method comprising:
    coupling a high voltage device to receive an input voltage and responsively generate a bias current and couple the bias current to an output transistor of the high voltage device including coupling a first current carrying electrode of a J-FET transistor to receive the input voltage, coupling a second current carrying electrode of the J-FET transistor to a first current carrying electrode of the output transistor, coupling a resistor to receive the bias current from the second current carrying electrode of the J-FET transistor and to couple the bias current to a control electrode of the output transistor;

coupling a switch element to shunt the bias current away from the output transistor when an output voltage is less than a first value; and coupling the output transistor of the high voltage device to generate an output current that is greater than the bias current when the output voltage is greater than the first value.

3. The method of claim 2 wherein coupling the switch element to shunt the bias current away from the output transistor when the output voltage is less than the first value includes coupling a pinch resistor to shunt the bias current away from the output transistor.

4. The method of claim 3 wherein coupling the pinch resistor to shunt the bias current away from the output transistor includes coupling a first terminal of the pinch resistor to the control electrode of the output transistor and a second terminal to an output for forming the output voltage.

5. The method of claim 2 wherein coupling the switch element to shunt the bias current away from the output transistor when the output voltage is less than the first value includes coupling a comparator coupled MOS transistor to shunt the bias current away from the output transistor.

6. The method of claim 5 wherein coupling the comparator coupled MOS transistor to shunt the bias current away from the output transistor includes coupling a first current carrying electrode of the comparator coupled MOS transistor to the control electrode of the output transistor, coupling a second carrying electrode of the comparator coupled MOS transistor to an output, and coupling a control electrode of the comparator coupled MOS transistor to receive a reference voltage.

7. The method of claim 6 further including stacking two threshold adjusted MOS transistors to form the reference voltage.

8. A power control system startup method comprising:
receiving an input voltage;
generating a first current from the input voltage;
shunting the first current to an output of the startup circuit;
using the first current to form an output voltage at the output of the startup circuit; and
coupling a second current from an output of an output transistor to the output of the startup circuit to form the output voltage after the output voltage is greater than a first value wherein the second current is greater than the first current.

9. The method of claim 8 wherein coupling the second current from the output of the output transistor to the output of the startup circuit to form the output voltage at the output of the startup circuit includes coupling a bias current to the output transistor of the startup circuit after the output voltage is greater than the first value.

10. The method of claim 8 wherein shunting the first current to the output of the startup circuit includes enabling a comparator transistor to couple the first current to the output of the startup circuit.

11. The method of claim 8 further including coupling the output to a voltage return to disable the power control system.

12. A power control system startup method comprising:
receiving an input voltage;
generating a first current from the input voltage;
shunting the first current to an output of a startup circuit including enabling a pinch resistor to couple the first current to the output of the startup circuit;
using the first current to form an output voltage at the output of the startup circuit; and
using a second current to form the output voltage when the output voltage is greater than a first value wherein the second current is greater than the first current.

13. The method of claim 12 wherein enabling the pinch resistor to couple the first current to the output of the startup circuit includes coupling the pinch resistor between the output of the startup circuit and a control electrode of an output transistor of the startup circuit, and enabling the pinch resistor when the output voltage is less than a pinch-off voltage of the pinch resistor.

14. A power control system method comprising:
generating a first output current at an output of a startup circuit responsively to a first value of an output voltage at the output of the startup circuit; and
coupling the output of the startup circuit to a voltage return to shunt the output current to the voltage return and disable the output voltage.

15. The method of claim 14 wherein generating the first output current at the output of the startup circuit responsively to the first value of the output voltage includes coupling a bias current to the output of the startup circuit and disabling an output transistor of the startup circuit.

16. The method of claim 15 wherein coupling the bias current to the output of the startup circuit and disabling the output transistor of the startup circuit includes shunting the bias current from a control electrode of the output transistor to the output of the startup circuit.

17. The method of claim 16 wherein shunting the bias current from the control electrode of the output transistor to the output of the startup circuit includes enabling a pinch resistor to shunt the bias current.

18. The method of claim 15 wherein generating the first output current at the output of the startup circuit responsively to the first value of the output voltage includes enabling the output transistor to generate the first output current.

19. The method of claim 18 wherein enabling the output transistor to generate the first output current includes coupling a J-FET transistor to a high voltage input to generate a bias current, and coupling the bias current to the output transistor to enable the output transistor.

* * * * *